Jan. 28, 1969  W. D. REA  3,424,404
AIRCAR

Filed Dec. 6, 1967

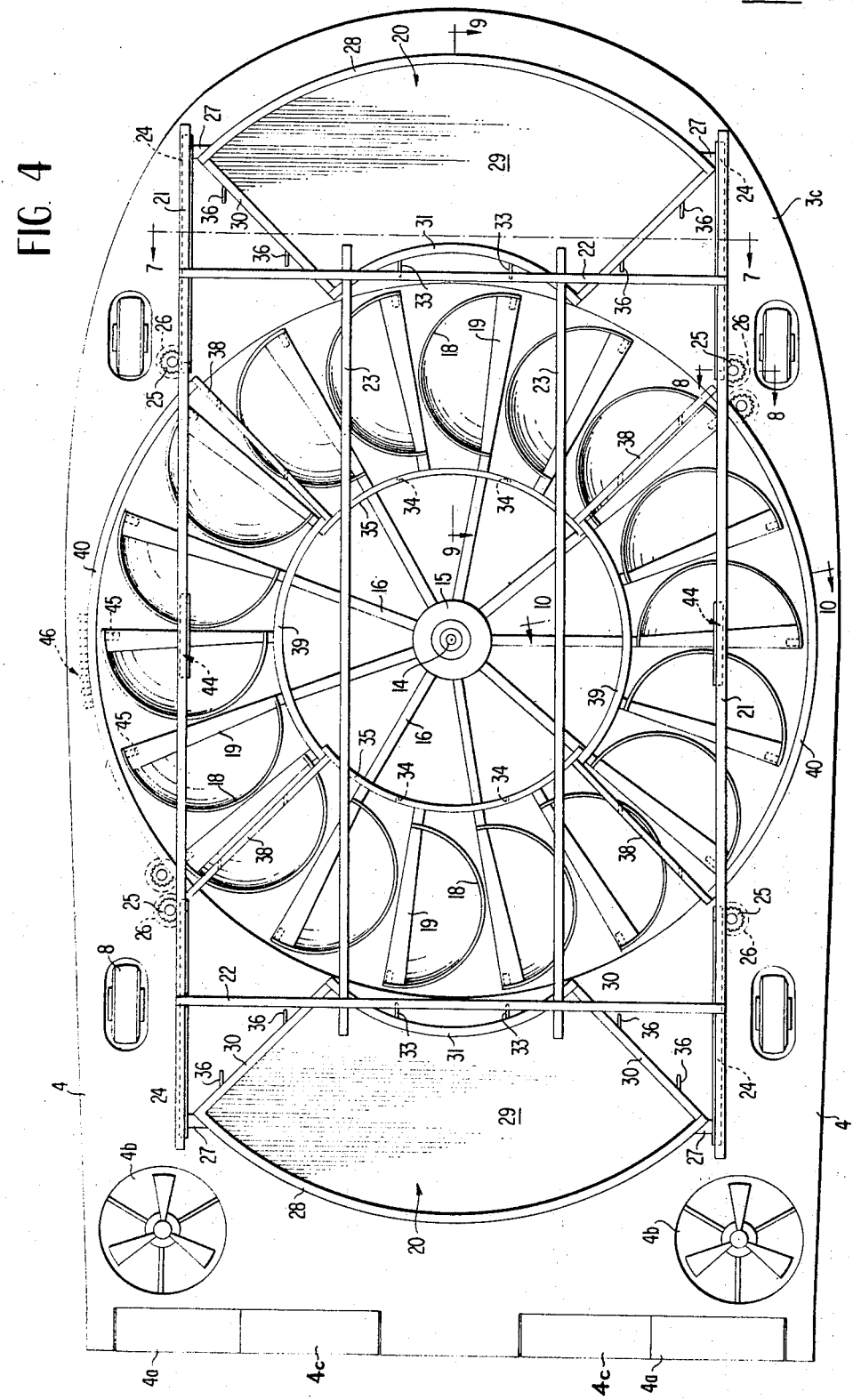

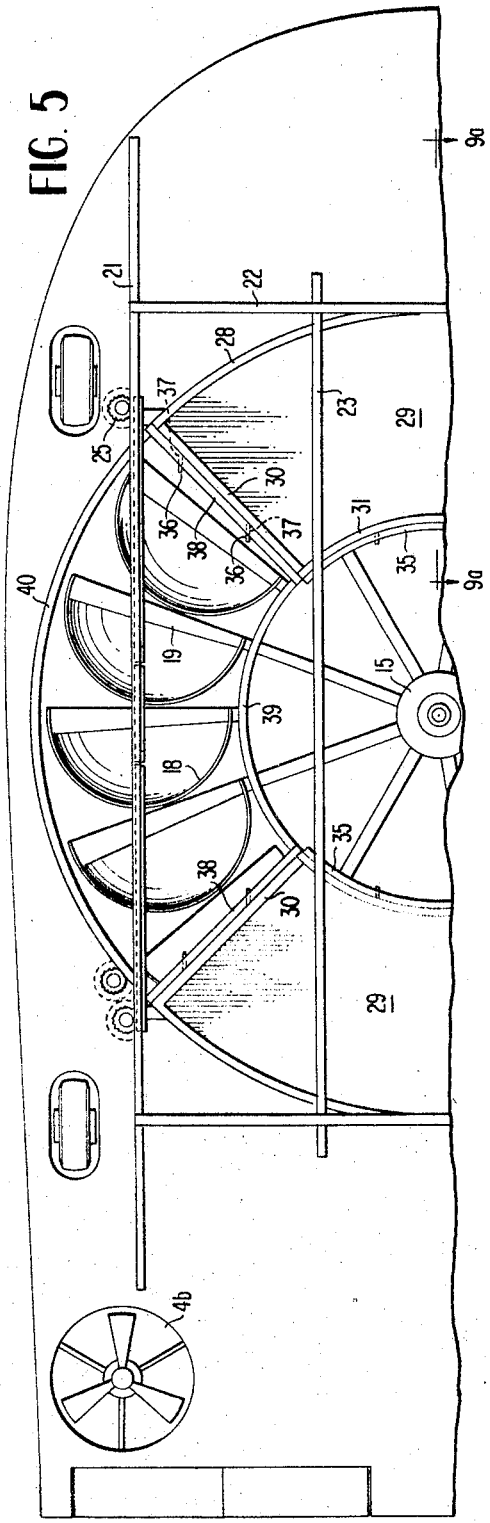

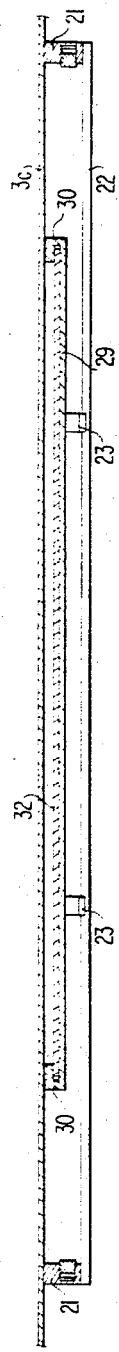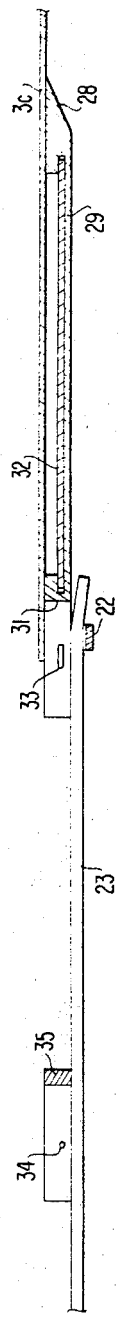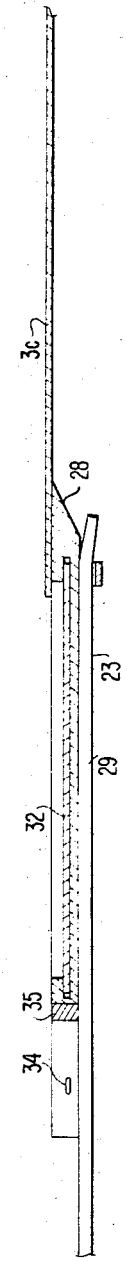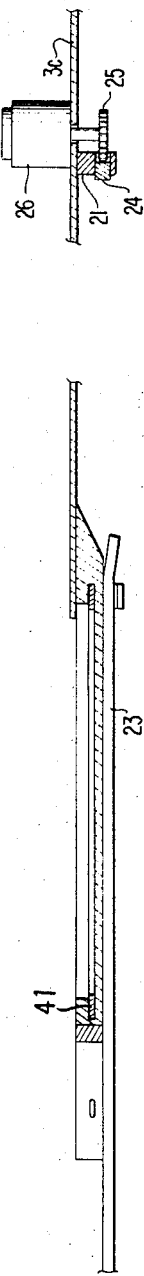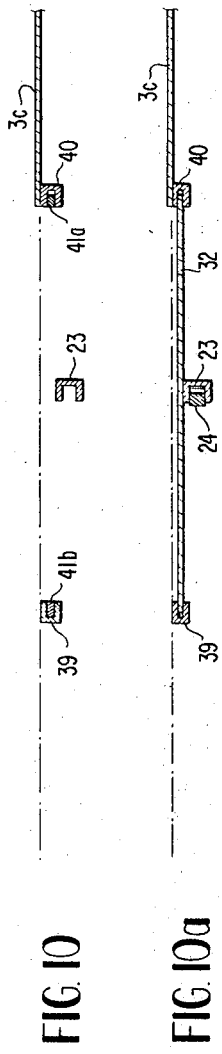

United States Patent Office 3,424,404
Patented Jan. 28, 1969

3,424,404
AIRCAR
Wallace D. Rea, 5414 Ye Old Post Road, Apt. 2,
Louisville, Ky. 40219
Continuation-in-part of application Ser. No. 565,971,
July 18, 1966. This application Dec. 6, 1967, Ser.
No. 688,601
U.S. Cl. 244—12             10 Claims
Int. Cl. B64c *19/04;* B60v *1/00*

ABSTRACT OF THE DISCLOSURE

A vertical take-off and landing aircraft having a spherical shell-like housing including a centrifugal blower and lifting blades for lifting the aircraft vertically and for effecting cruise propulsion.

---

*Cross reference to related application*

This application is a continuation-in-part of application Ser. No. 565,971, filed July 18, 1966, now abandoned, entitled Air Transportation.

*Background of the invention*

The steady increase of vehicular and air traffic in today's metropolitan areas has resulted in a continuing search to improve both intra and inter metropolitan area transportation. Vehicular transportation is constantly being improved by the imaginative design of rapid rail and road systems, and the vehicles to be used on these systems.

To relieve congested air transportation in metropolitan areas, it has been proposed to employ vertical takeoff and landing aircraft which preclude the use of long runways and which are capable of landing and taking off in mid-city areas. The various types of VOTL aircraft which have been devised have not been satisfactory for providing this type of air transportation due to their cumbersome design, expense to manufacture and operational complexity.

To overcome the disadvantages experienced in hitherto employed VOTL aircraft, the aircar of the present invention has been devised which is characterized by its simplicity in design, and which is capable of being mass produced, commercialized, and easily operated in a manner similar to today's automobile.

*Summary*

The aircar of the present invention comprises, essentially, a vertical take-off and landing type aircraft having a spherical shell-like housing and a blower including lifting blades whereby a stream of air is directed through the spherical housing to thereby effect superior lift characteristics, the centrifugal blower also being employed to effect cruise propulsion. The aircar is also provided with a plurality of selectively actuated air-flow control panels for directing the air flow through the spherical shell-like housing to facilitate either the vertical or horizontal direction of flight of the aircar.

*Brief description of the drawing*

FIGURE 4 is a bottom plan view of the aircar showing the air flow control panels in stowed position;

FIGURE 5 is a fragmentary bottom plan view showing the position of the panels when moved axially to closed position;

FIGURE 6 is a fragmentary bottom plan view showing the position of one of the panels when rotated to closed position;

FIGURE 7 is a view taken along line 7—7 of FIGURE 4;

FIGURE 8 is a view taken along line 8—8 of FIGURE 4;

FIGURE 9 is a view taken along line 9—9 of FIGURE 4;

FIGURE 9a is a view taken along line 9a—9a of FIGURE 5;

FIGURE 9b is a view taken along line 9b—9b of FIGURE 6;

FIGURE 10 is a view taken along line 10—10 of FIGURE 4;

FIGURE 10a is a view taken along line 10a—10a of FIGURE 6;

*Description of the preferred embodiment*

Figure 1:
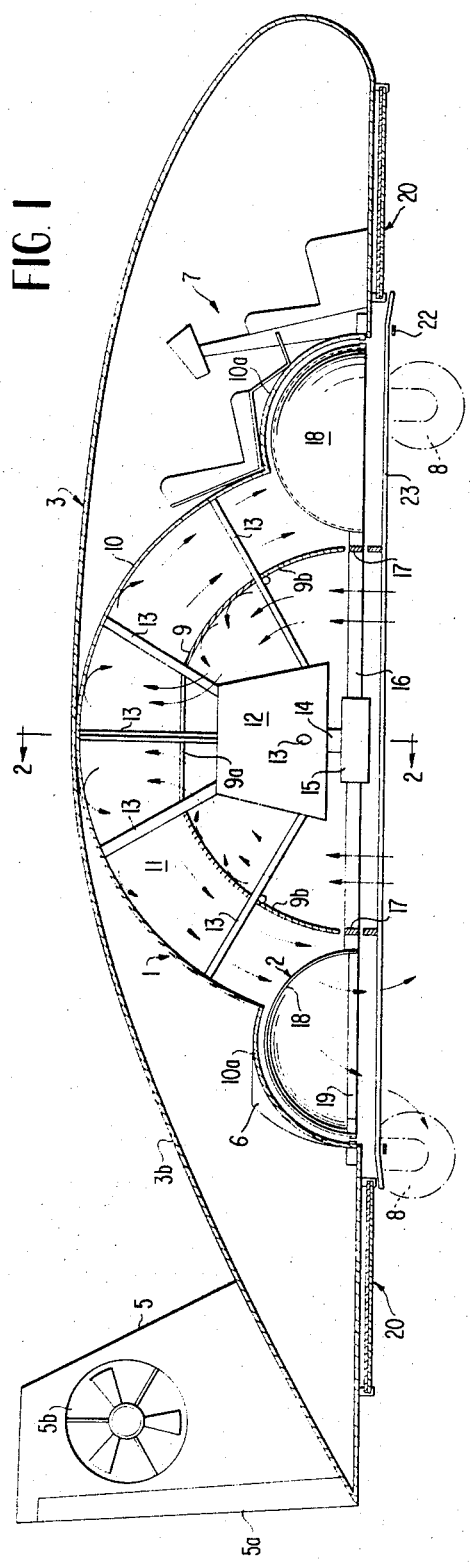
FIGURE 1 is a sectional, side elevational view of the aircar of the present invention.
Figure 3:
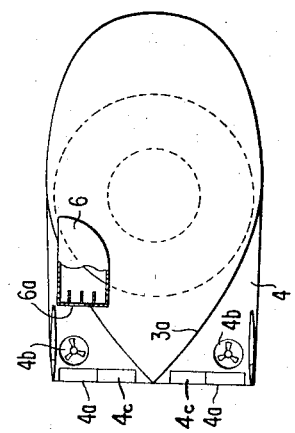
FIGURE 3 is a reduced top plan view of the aircar.
Figure 2:
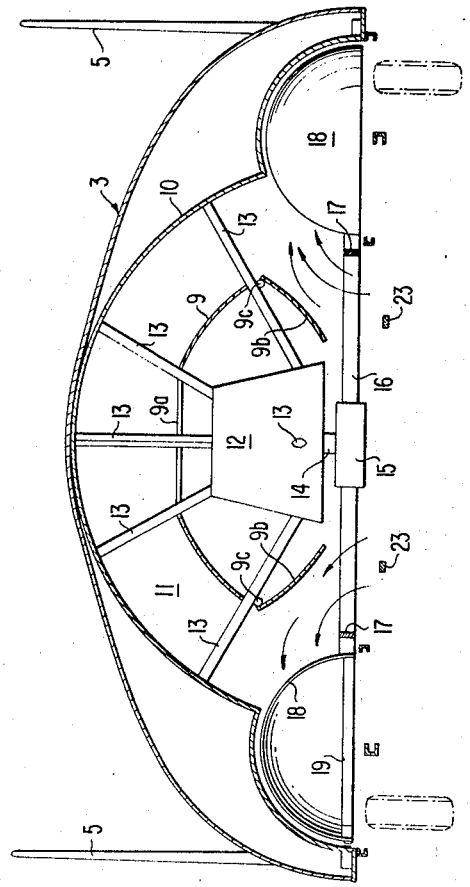
FIGURE 2 is a sectional view taken along line 2—2 of FIGURE 1.

Referring to the drawings and more particularly to FIGURES 1, 2 and 3, the aircar of the present invention comprises a spherical shell-like housing 1 having a rotor assembly 2 mounted therein, the spherical housing and associated rotor assembly being mounted within a streamlined cabin structure 3, the tail section of which tapers inwardly as at 3a (FIGURE 3) and downwardly as at 3b (FIGURE 1) to merge into the horizontal stabilizer portion 4 having the conventional ailerons 4a and elevators 4c mounted on the trailing edge thereof. A pair of vertical fins 5, having rudders 5a, are mounted on the horizontal stabilizer adjacent the lateral edges thereof. The horizontal stabilizer and each of the fins are provided with rotors 4b and 5b, respectively, for stabilizing the aircar when hovering or when in flight. A tangential exhaust port 6, having closures 6a, adapted to be opened during horizontal flight mode of the craft is formed in the cabin structure and communicates with the shell-like housing 1 in the portion 10a thereof whereby air from the rotor assembly 2 may be exhausted during cruise propulsion, to be described more fully hereinafter. The forward end of the cabin structure is provided with a control compartment 7 for accommodating the operator, and suitable retractable landing gear 8 are provided for supporting the aircar on the ground.

Referring to FIGURES 1, 2 and 4, the shell-like housing 1 comprises an inverted shell-like member 9 mounted within concentric to, and spaced from another inverted hemispherical shell-like member 10, an aperture 9a being formed in the apical portion of the inner shell and communicating with the space 11 between the shells.

The rotor assembly 2 comprises a suitable prime mover 12 such as an internal combustion engine or gas turbine, which is positioned within the inner shell 9 and secured thereto by means of suitable struts 13 secured to the walls of the shells. The engine drive shaft 14 has a hub 15 secured thereto from which a plurality of spokes 16 emanate, the outer ends of the spokes being connected to a rim 17 (FIGURE 1). The impeller assembly for the rotor assembly consists of a plurality of blower blades 18 formed of quarter-section spherical members, the lower end of each blower blade being subtended by a lifting blade 19 formed as an airfoil. As will be seen in FIGURES 1 and 2, the outer shell 10 is formed with a bulbous lower edge portion 10a for accommodating the impeller assembly within the space between the inner and outer shells and as indicated in FIGURES 1 and 3 exhaust port 6 is connected in communication with shell portion 10a.

By the construction and arrangement of the aircar thus far described, when the impeller assembly is rotated, air, as shown by the arrows in FIGURE 1, which is drawn upwardly within the inner shell 9, flows through the aperture 9a and downwardly through the space 11 and over the lifting blades 19; thus, the vertical lifting force for the aircar is provided by the air impinging against the walls of the inner and outer spherical shells 9 and 10, respectively, and the lifting blades 19, as well as the interior of spherical members 18. The air flow as shown by the arrows is caused by the rotating scoop-like spherical members 18 forcing the air to flow over the respective airfoil lifting blades 19 and then downwardly through the bottom exit openings between the trailing edges of the lifting blades 19 and the respective back walls of the spherical members 18.

In order that the impeller assembly may be employed for propelling the aircar for horizontal flight after it has reached its desired altitude, a panel assembly 20 is provided for closing the air exhaust end of space 11 beneath the impeller assembly to thereby nullify the effect of lifting blades 19 and to re-direct the existing flow of air developed by the blower blades outwardly of the aircar through exhaust port 6, which is opened for this purpose. It will be noted that exhaust port 6 presents a substantially smaller opening than the air intake opening beneath inner shell 9, which is substantially defined by rim 17 and rim sections 35 and channels 39, and since the intake port is substantially larger than the exhaust port, the exhaust port 6 will function somewhat as a nozzle. The air pressure outside the craft is less than in the area around the rotating blower blades so the air flow will be out of port 6 from the area of higher pressure to the zone of lower pressure. The centrifugal action of the members 18 and 19 play a part in creating the pressure differential and causing the flow of air from port 6. Additionally, since the lifting force is being nullified, the lower end portion 9b of the inner shell, which is hingedly connected as at 9c to the upper portion thereof, is moved to a position shown in FIGURE 2 whereby the air being drawn into the aircar can flow directly into the blower blades without first passing through the space 11.

As will be seen in FIGURES 4, 7 and 9, the panel assembly 20 comprises a pair of spaced, parallel, longitudinally extending channels 21 secured to the bottom wall 3c of the aircar, the channels being reinforced by a pair of transversely extending members 22 having their ends suitably secured to the channels and by a pair of longitudinally extending reinforcing members 23 secured to the transversely extending members 22. The end portions of each of the channels 21 have racks 24 slidably mounted therein which mesh with a respective pinion 25 adapted to be driven by a respective motor 26 (FIGURE 8) mounted on the bottom wall 3c of the aircar. The racks on corresponding ends of the channels are provided with inwardly extending brackets 27 which are secured to a flange 28 integrally formed on the outer peripheral edge of an arcuate panel 29 shaped as a sector. The sides and inner peripheral edge of panel 29 are similarly formed with flanges 30 and 31, respectively, to thereby form a container for another sector-shaped panel 32 superimposed on the upper surface of panel 29. By the construction and arrangement of the panel assembly thus far described, when motors 26 are energized, the pinions 25 drive the racks 24 and associated panels 29 and 32 longitudinally inwardly of the aircar or toward the hub 15 of the impeller assembly, so that the panels 29 and 32 will have moved from the position shown in FIGURES 4 and 9 to the position illustrated in FIGURES 5 and 9a. In order to maintain the panels 29 in this inward position, the inner flange 31 is provided with a pair of inwardly projecting fingers 33 adapted to be inserted into apertures 34 formed in a rim section 35 secured to the longitudinally extending reinforcing members 23. As will be seen in FIGURES 9 and 9a, the reinforcing members also provide skids for the panels as they slide toward the rim sections 35. The side flanges 30 of panels 29 are also provided with fingers 36 adapted to be inserted into apertures 37 formed in radially extending flanges 38. The inner ends of each of the radial flanges 38 are secured to an arcuate channel 39 which is in turn secured to the rim sections 35, the outer ends of each of the radial flanges 38 being similarly secured to an arcuate channel 40 which is secured to the bottom wall 3c of the aircar.

Figure 11:
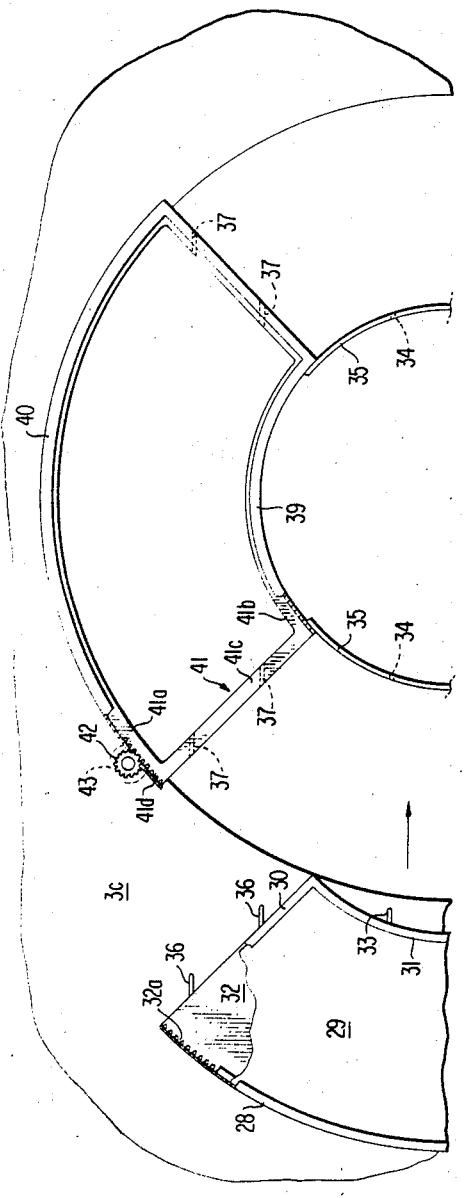
FIGURE 11 is a fragmentary bottom plan view of the air flow control panels as they are being moved axially.
Figure 12:
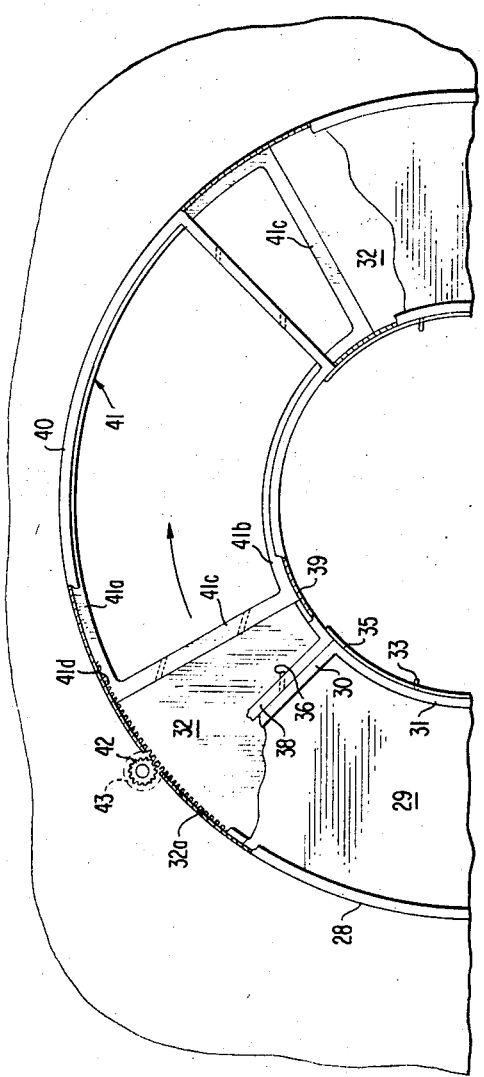
FIGURE 12 is a fragmentary bottom plan view of some of the panels as they are being rotated to closed position.

Referring to FIGURES 10, 11 and 12, an arcuate, open, framework 41 is slidably mounted within the inner and outer arcuate channels 39 and 40, respectively, the framework including an outer arcuate rim 41a positioned within channel 40 and an inner arcuate rim 41b positioned within channel 39, the end portions of the inner and outer rims of the framework being connected by radial arms 41c. The end portion of rim 41a is provided with gear teeth 41d which mesh with a pinion gear 42 adapted to be driven by a motor 43, the outer peripheral edge of panel 32 also being provided with gear teeth 32a adapted to mesh with pinion 42.

As will be seen in FIGURES 5, 6, 10a, 11 and 12, after the panels 29 and 32 on each end of the aircar have been moved inwardly by the motors 26 as shown in FIGURE 5, the diametrically disposed motors 43 are then energized to cause the respective framework members 41 to slide 90° in a clockwise direction, as shown in FIGURE 12, whereby the leading edge of radial arm 41c abuts the respective trailing edge of panel 32 to thereby push each of the panels 32 a corresponding distance to the closed position as shown in FIGURES 6 and 10a. It will thus be apparent that after panels 32 have been moved to closed position, the framework members 41 will have been moved to a superimposed position on panels 29, which position was previously occupied by panels 32. To return the panels to the open position, the motors 43 are reversed to move the framework members 41 90° counterclockwise to thereby push the panels 32 back to their superimposed position on respective panels 29. After the panels 32 have been moved to the superimposed position on panels 29, the motors 26 are then energized to move the panels longitudinally away from the hub to a position shown in FIGURE 4.

Referring to FIGURES 4 and 6, limit stops 44 are mounted in the medial portion of each of the longitudinal channels 21 to limit the inward movement of the racks 24; each of the limit stops comprising a bar positioned within a respective channel and having magnetic portions 44a of like polarity on each end thereof which are attracted to magnetic portions 24a of opposite polarity provided on the inner end portions of racks 24.

It will also be noted in FIGURE 4 that pole pieces 45 forming armature coils are mounted in the tips of the blades 19 which cut through magnetic lines of flux provided by field poles 46 secured to the bottom wall of the aircar adjacent the periphery of the blower assembly where the blower assembly can also function as a generator to supply the necessary electrical power for energizing the various electrical components included in the aircar. Alternatively, the field and armature poles can also be employed as a motor in an emergency situation for driving the blower assembly in case the prime mover 12 should fail, and in addition for starting the prime mover 12.

To operate the aircar of the present invention, the panel assemblies 20 are first disposed in the open position as shown in FIGURES 1 and 4, and the lower end portion 9b of the inner shell and the exhaust port closures 6b are disposed in the closed position as shown in FIGURES 1 and 3, respectively. The impeller assembly is then actuated to cause air to flow through the spherical shells to thereby lift the aircar vertically as described hereinabove. After the aircar has reached its desired altitude, the panel assemblies 20 are then moved to the closed position, as described hereinabove, the lower end portion 9b of the inner shell being moved to open position as shown in FIGURE 2 and the exhaust port 6 being opened, whereby air drawn into the impeller assembly is exhausted through the port 6 to thereby propel the aircar horizontally, it being understood that during the vertical lifting and horizontal flight of the aircar, the rotors 4b and 5b are suitably actuated to stabilize the aircar.

I claim:

1. An aircar of the character described comprising, a housing including an inverted hemispherical, inner shell-like member having an open bottom portion, said inverted inner hemispherical member being mounted within, concentric to and spaced from an outer inverted hemispherical shell-like member having an open bottom portion, an aperture formed in the apical portion of the inner shell-like member communicating with the space between the shell-like members, and a rotor assembly, including a blower and lifting blades, mounted within the space between the open bottom portions of the inner and outer shell-like members which defines the exhaust end of the space, the axis of rotation of said blower being concentric with the inner and outer shells, whereby the blower causes air to be drawn upwardly into and against the inner hemispherical shell and through the aperture to impinge against the wall of the outer hemispherical shell and then downwardly through the space between the inner and outer shells to exhaust therefrom through said blower and lifting blades to thereby lift the aircar.

2. An aircar according to claim 1, wherein a tangential exhaust port is formed on the housing and communicates with the space between the inner and outer shells adjacent said blower and lifting blades.

3. An aircar according to claim 1 wherein the housing and associated rotor assembly are mounted within a streamlined cabin structure having a control compartment disposed in the forward end thereof, the tail section of said structure tapering inwardly and downwardly to merge into a horizontal stabilizer portion, elevator means connected to the trailing edge of said stabilizer portion, a pair of vertical fins mounted on the stabilizer portion adjacent the lateral edges thereof, rudder means connected to the trailing edge of said fins, rotor means mounted in said stabilizer and said fins for stabilizing the aircar when hovering or in flight.

4. An aircar according to claim 1, wherein the blower comprises a plurality of circumferentially spaced blades formed of substantially quarter-section spherical members, and a said lifting blade formed as an airfoil subtending the lower end of each quarter-section spherical member.

5. An aircar according to claim 2 wherein a movable panel assembly is mounted on the housing in proximity to the exhaust end of the space between the inner and outer shells for closing the exhaust end of said space to thereby nullify the effect of said lifting blades and to re-direct the flow of air developed by the blower blades outwardly of the aircar through said tangential exhaust port.

6. An aircar according to claim 5 wherein said movable panel assembly comprises, a pair of spaced, parallel, horizontally disposed channels, panel means extending between said channels, the ends of said panel means being slidably mounted on said channels, and drive means operatively connected to said panel means for moving said panel means to closed position.

7. An aircar according to claim 6 wherein the panel means comprises a pair of arcuate, sector-shaped panels, each panel being positioned on corresponding ends of said channels, a second pair of arcuate, sector-shaped panels superimposed on said first-mentioned pair of panels; said drive means comprising racks slidably mounted in said channels, said racks being connected to the ends of said first pair of panels, pinions meshing with said racks and motor means connected to said pinions, whereby when said motor means are energized each of said first pair of panels carrying a respective panel of said second pair, is moved inwardly longitudinally of the channels towards each other; gear teeth formed on the outer peripheral edge of each panel of said second pair of arcuate sector-shaped panels, pinion gears meshing with said gear teeth on the peripheral edge of said second pair of panels when said panels have been moved inwardly on said channels, and motor means connected to said pinion gears, whereby when said second-mentioned motor means are energized each of the second pair of panels is moved from the superimposed position on the respective panel of said first pair.

8. An aircar according to claim 7, wherein arcuate channel means are positioned in proximity to the horizontally disposed channels for receiving the second pair of panels when they are moved from the superimposed position on the first pair of panels, and arcuate, open, framework means slidably mounted in said arcuate channel means, whereby as the second pair of panels are moved from said superimposed position, the leading edges of said second pair of panels push said framework means into superimposed position on said first pair of panels.

9. An aircar according to claim 7 wherein stop means are mounted within the channels to limit the inward movement of said first pair of panels.

10. An aircar according to claim 1 in which said blower includes a plurality of circumferentially spaced blower blades, pole pieces forming armature coils mounted in the tips of the blower blades, and field poles secured to the aircar housing adjacent the periphery of the blower assembly whereby the blower assembly also functions as a generator for supplying the necessary electrical power for the aircar.

References Cited

UNITED STATES PATENTS 3,142,456   7/1964   Lazareff _____ 244—23
3,215,218  11/1965   Hurst _____ 180—118 X MILTON BUCHLER, *Primary Examiner.*

T. W. BUCKMAN, *Assistant Examiner.*

U.S. Cl. X.R.
180—117